United States Patent
Huter et al.

(10) Patent No.: US 7,089,820 B2
(45) Date of Patent: Aug. 15, 2006

(54) MOTOR VEHICLE WITH LOWERED PISTON ENGINE

(75) Inventors: Jürgen Huter, Weissach (DE); Bernhard Jutz, Burgstetten (DE); Johannes Leweux, Esslingen (DE); Dieter Nowak, Weilheim (DE); Hubert Schnübke, Stuttgart (DE); Alexander von Gaisberg-Helfenberg, Beilstein (DE)

(73) Assignee: DaimlerChrysler AG, Stuttgart (DE)

( * ) Notice: Subject to any disclaimer, the term of this patent is extended or adjusted under 35 U.S.C. 154(b) by 139 days.

(21) Appl. No.: 10/875,450

(22) Filed: Jun. 23, 2004

(65) Prior Publication Data

US 2005/0183528 A1 Aug. 25, 2005

(30) Foreign Application Priority Data

Jun. 26, 2003 (DE) ................. 103 28 683

(51) Int. Cl.
*F16H 3/08* (2006.01)
(52) U.S. Cl. .................. 74/329; 74/325; 74/331; 123/197.1; 180/291; 180/374; 180/376
(58) Field of Classification Search ........... 180/376, 180/291, 374; 74/333, 325, 329, 331, 330; 123/197.1; 192/48.92
See application file for complete search history.

(56) References Cited

U.S. PATENT DOCUMENTS

| 4,331,212 | A | * | 5/1982 | Tsuboi | 180/230 |
| 4,425,989 | A | * | 1/1984 | Gotoda | 192/48.92 |
| 6,345,679 | B1 | * | 2/2002 | Sasaki | 180/274 |
| 6,715,376 | B1 | * | 4/2004 | Hojyo et al. | 74/414 |
| 6,799,485 | B1 | * | 10/2004 | Kawamoto et al. | 74/335 |

FOREIGN PATENT DOCUMENTS

| DE | 40 29 058 | 3/1992 |
| DE | 44 21 926 | 1/1996 |
| DE | 101 43 514 | 6/2002 |

* cited by examiner

Primary Examiner—Charles A. Marmor
Assistant Examiner—Tara L. Bolton
(74) Attorney, Agent, or Firm—Klaus J. Bach

(57) ABSTRACT

In a motor vehicle engine and transmission support arrangement at the front end of a motor vehicle wherein the engine has a drive shaft with a drive wheel mounted thereon, and a torque converter unit with an input shaft and an input wheel mounted on the input shaft which is vertically displaced from the output shaft of the engine a power transmission structure is disposed between the drive wheel of the engine and the input wheel of the torque converter unit for transmitting the engine power to the torque converter unit.

5 Claims, 2 Drawing Sheets

MOTOR VEHICLE WITH LOWERED PISTON ENGINE

BACKGROUND OF THE INVENTION

The invention relates to a motor vehicle with a lowered piston engine supported on a vehicle body structure in the area of the front axle of the vehicle wherein the piston engine includes a drive shaft, particularly a crankshaft, with a drive wheel and a torque converter unit, particularly an automatic transmission, having an input shaft on which an input wheel is mounted.

In such motor vehicles, the position of the piston engine is in close relationship with the position of the torque converter unit because of a direct torque transfer. At the same time, the position of the torque converter unit, particularly in the vertical direction, is essentially given since the torque converter unit extends into the area of the passenger compartment of the motor vehicle or is disposed in close vicinity of this area. Correspondingly, particularly the vertical position of the piston engine depends on the position of the torque converter unit whereby the distance between the piston engine and the engine compartment hood disposed above are particularly small. In today's passenger cars, this distance is hardly more than 25 mm. As a result, in case of a collision of the motor vehicle with a person, there is only a small deformation clearance for the engine hood so that there is a correspondingly high injury potential for a person involved in such collision.

DE 40 29 058 C2 discloses a motor vehicle with a rear piston engine. The piston engine is connected by way of a clutch to a torque converter unit in the form of a manual gear shift transmission, wherein the clutch and the transmission are connected coaxially and directly to the drive shaft of the piston engine. For changing the center of gravity of the piston engine in the motor vehicle, the drive shaft of the engine is not coaxial with the crank shaft of the piston engine but an additional shaft is supported within the engine and coupled to the crankshaft by a pair of spur gears.

It is the object of the present invention to provide, by as simple means as possible, a motor vehicle with a piston engine whose position in the vehicle body is flexible so that it can be positioned as far as possible away from adjacent vehicle body components.

SUMMARY OF THE INVENTION

In a motor vehicle engine and transmission support arrangement at the front end of a motor vehicle wherein the engine has a drive shaft with a drive wheel mounted thereon and a torque converter unit with an input shaft and an input wheel mounted on the input shaft which is vertically displaced from the output shaft of the engine, a power transmission structure is disposed between the drive wheel of the engine and the input wheel of the torque converter unit for transmitting the engine power to the torque converter unit.

For the transmission of the power from the crankshaft to the drive shaft, a pair of spur gears, a chain or a belt transmission structure may be provided outside the engine. The drive shaft is preferably so displaced from the crankshaft of the piston engine that the drive shaft of the engine is disposed below the input shaft of the torque converter unit. With such a displacement, an additional degree of freedom for the arrangement of the engine with respect to the position of the torque converter unit is provided. The engine can therefore be arranged with a particularly large distance from a motor hood disposed above the engine. As a result, a particularly large deformation area can be provided for the hood whereby the risk of injuries to a person in case of a collision is reduced. The arrangement according to the invention is applicable in connection with longitudinal as well as transverse engine installations.

In a particular embodiment of the invention, at least one intermediate gear is provided between the engine drive shaft and the torque converter unit input shaft, whose axis of rotation extends parallel to the axes of rotation of the engine drive shaft and the torque converter unit input shaft and which is in engagement with the drive wheel and/or the input wheel. An adapted geometric configuration of the drive wheel, the input wheel and the intermediate wheel will not only facilitate a vertical alignment of the piston engine drive and the torque converter unit relative to one another but also makes an additional torque conversion possible. Preferably, the engine drive and torque converter input wheels and at least one intermediate wheel are spur gears. Alternatively, the drive wheel, the input wheel and the intermediate wheel may be traction wheels which are in power transmitting engagement with one another.

In another embodiment of the invention, two intermediate shafts with parallel axes of rotation are provided as power transmission means and the drive wheel of the engine as well as the input wheel of the transmission are in force transmitting engagement with the intermediate shafts. Preferably, the drive wheel, the input wheel and the intermediate shafts are in the form of gears with uniform gearing means.

In still another embodiment of the invention, the intermediate shafts each include two intermediate wheels which are joined for common rotation. The intermediate wheels may be supported on the intermediate shafts so as to be axially movable for the compensation of tolerances.

The engine drive wheel and the transmission input wheel may further have different diameters wherein the diameters are adapted particularly to the displacement between the axis of rotation of the drive shaft of the piston engine and the axis of rotation of the input shaft of the torque converter unit in such a way that the contact points between the drive wheel and the power transmission means on one hand and the power transmission means and the input wheel on the other hand are disposed on a line which extends parallel to the axes of rotation. Then if gears are used, the gear structures can be manufactured in a particularly simple manner.

Also, the vehicle body structure is the front engine hood wherein between the engine hood and the piston engine, there is in vertical direction essentially a distance of more than 25 mm, preferably a distance of more than 35 mm and there is a displacement between the axis of rotation of the drive shaft of the piston engine and the axis of rotation of the input shaft of the torque converter unit of more than 5 mm, and preferably more than 10 mm. As a result, the torque converter unit can be arranged in a conventional installation but the piston engine is disposed in the vehicle body at a lower level so that a sufficiently large deformation zone for the engine hood above the engine is obtained for absorbing the impact of a pedestrian on the engine hood during a collision.

The invention will become more readily apparent from the following description of a particular embodiment thereof on the basis of the accompanying drawings.

DESCRIPTION OF A PREFERRED EMBODIMENT

Figure 1:
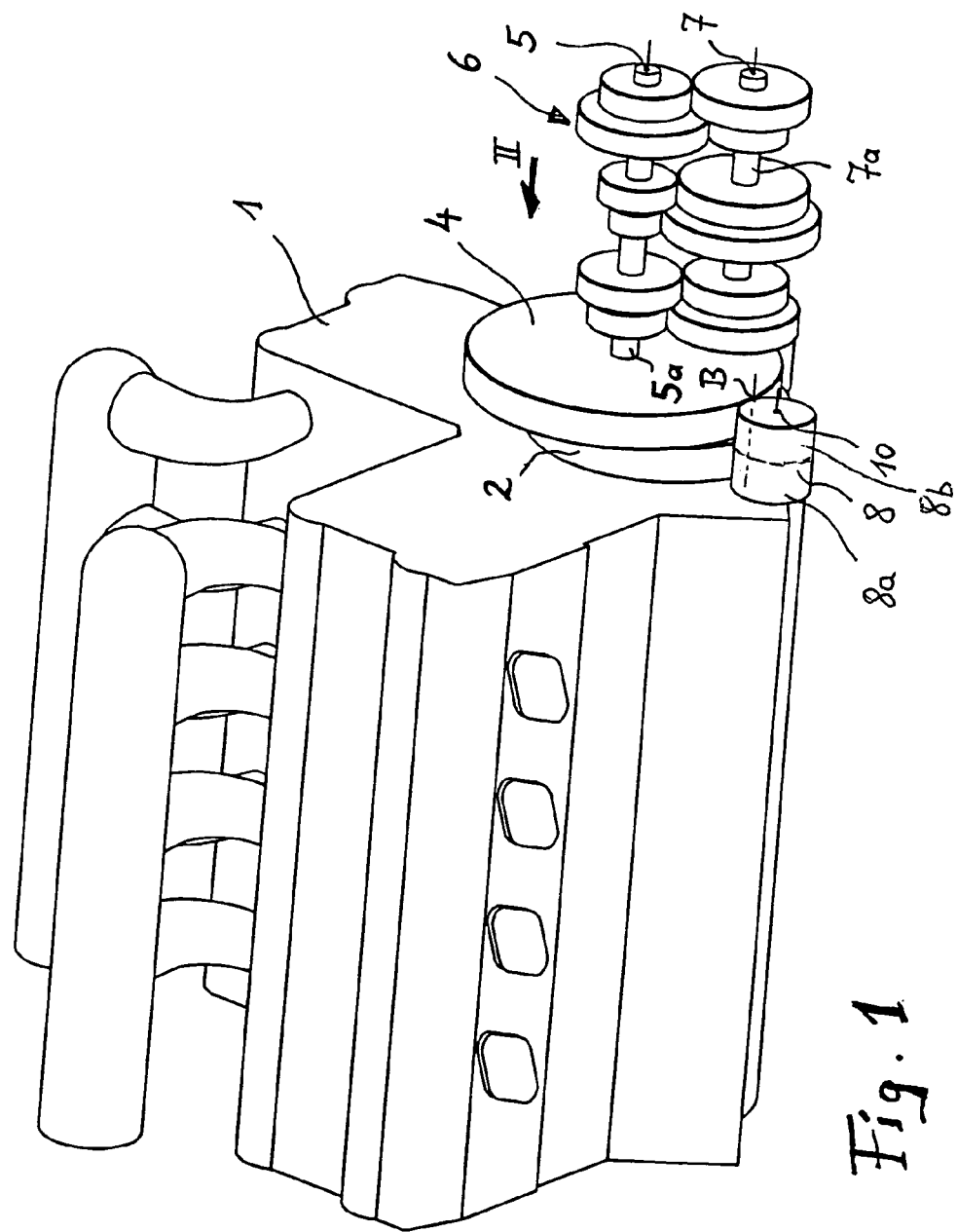
FIG. 1 is a perspective view showing a piston internal combustion engine coupled with a torque converter unit.
Figure 2:
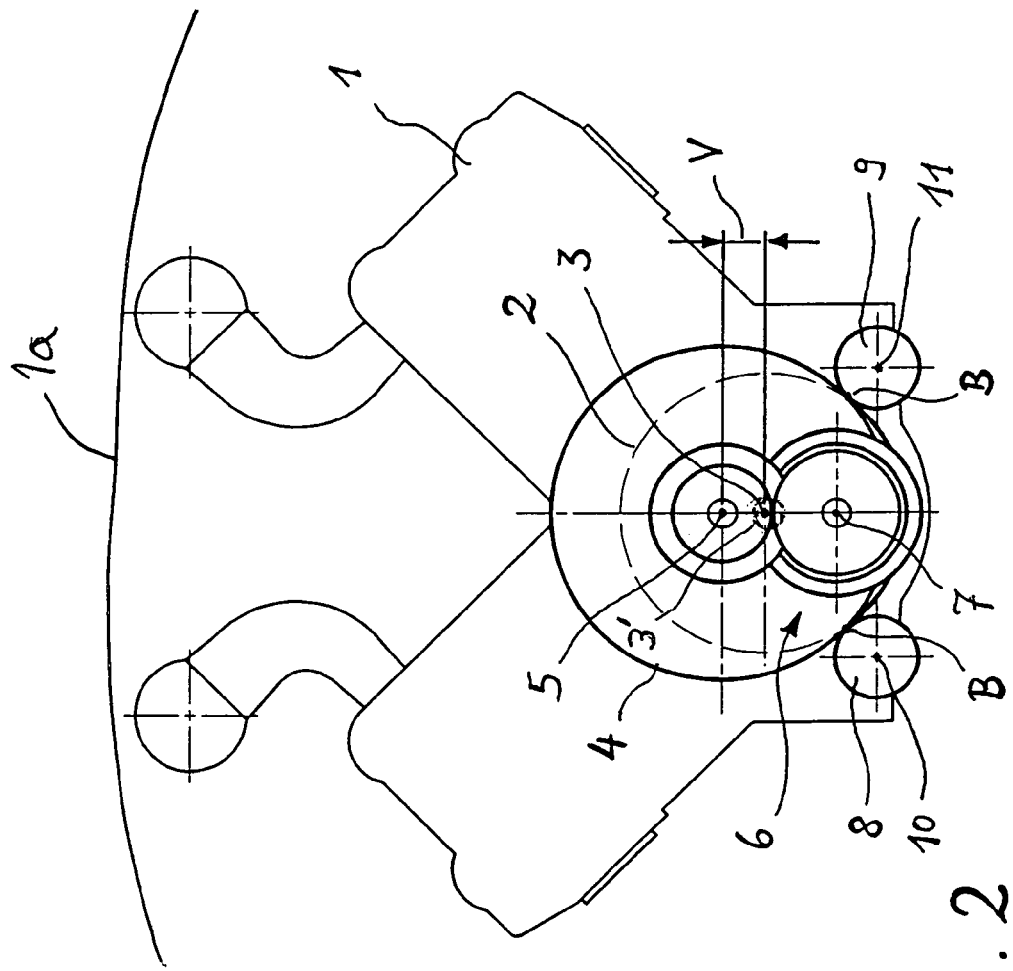
FIG. 2 shows schematically the arrangement of FIG. 1 viewed in the direction of the arrow II.

The invention relates to a motor vehicle and specifically to a passenger car with a piston engine 1 installed in the front of the vehicle body. The piston engine 1 is for example a V8 engine installed in the motor vehicle longitudinally in the area of the front axle of the motor vehicle. In the vertical direction above the piston engine 1, a vehicle body element (not shown) in the form of a motor hood 1a1a is arranged so as to cover the engine compartment. Additional capsules and/or covers may be provided between the engine 1 and the motor hood 1a. Between the engine 1 and the hood 1a, there is a certain distance which is provided on one hand for accommodating relative movements between the engine and the hood 1a and, on the other hand, to provide a zone for accommodating deformations of the hood 1a in case of a collision of the motor vehicle (particularly the hood) with a smaller movable object or person during a collision.

The piston engine 1 transmits its drive power to a torque converter unit 6, which is operatively connected to the drive shafts of the vehicle. The torque converter unit 6 is for example a fully automatic transmission. Alternatively, the transmission may be a manual shift or a semi-automatic transmission. It includes a second shaft 7a having an axis of rotation 7 which extends parallel to the axis of rotation 5 of the input shaft 5a of the transmission. In a modified embodiment, a clutch is provided at one end of the torque converter unit 6. Further details of the torque converter unit 6 as such are not important in connection with the present invention. The torque converter unit 6 extends, because of its size in the area of a center tunnel into the passenger compartment area of the motor vehicle so that its position is predetermined not only in the longitudinal vehicle direction but also in vertical direction and its position in the motor vehicle is not flexible.

The piston engine 1 includes a drive shaft 3' which is identical with, or formed as one piece with, a crankshaft to which the eight piston connecting rods of the engine are connected. On the drive shaft 3', a drive wheel 2 is mounted which rotates about the axis of rotation 3 of the drive shaft 3'. The axis of rotation of the crankshaft which is identical with the axis of rotation 3 of the drive shaft extends in the longitudinal direction of the vehicle and parallel to an axis of rotation 5 of an input shaft 5a of the torque converter unit 6, wherein the axes of rotation 3 and 5 are displaced by a distance V. The input shaft 5a of the torque converter unit 6 is further provided with an input wheel 4 by way of which the engine torque is transmitted to the torque converter unit 6.

For bridging the displacement length V and coupling the drive wheel 2 of the piston engine 1 with the input wheel 4 of the torque converter unit 6 two roller-like intermediate wheels 8, 9 are provided which rotate about axes of rotation 10, 11 that extend parallel to the axes of rotation 3, 5. The intermediate wheels 8, 9, are, like the drive wheel 2 and the input wheel 4, preferably in the form of gears with a uniform corresponding gear structure. For a particularly simple design and manufacture, the drive wheel 2 and the input wheel 4 have different diameters which are adapted to the displacement V so as to ensure that the contact points (or contact lines) between the drive wheel 2 and the intermediate wheel 8 on one hand as well as the input wheel 4 and the intermediate wheel on the other hand are disposed on a line B which extends parallel to the axes of rotation 3, 5 in the direction of the longitudinal vehicle axis. The same applies correspondingly to the other intermediate wheel 9 if the axes of rotation 10 and 11 are disposed at the same level. Then additionally, a force equalization on the drive wheel 2 and the input wheel 4 in the transverse vehicle direction is obtained. In a modified embodiment, the intermediate wheels 8, 9 are replaced by intermediate shafts on which in each case two gears or gear areas 8a, 8b are mounted for rotation with the respective shafts. In this way, different teeth structures can be used for the drive wheel and the input wheel. As described, an additional transmission can be provided by means of the gears 2, 4, 8 and 9 wherein pairs of gears can be replaced optionally for example (toothed) belt- or by chain drives.

The displacement V is preferably so selected that the axis of rotation of the drive shaft of the piston engine 1 in vertical direction is disposed by 5 mm to 50 mm below the axis of rotation 5 of the input shaft 5a of the torque converter unit 6. In accordance therewith, the drive wheel 2 is smaller than the input wheel 4.

The displacement V provides for an additional degree of freedom in the selection of the position of the piston engine within the vehicle body. In comparison with motor vehicles in accordance with the state of the art, the distance between the engine and the motor hood disposed thereabove can be increased by the displacement V. Consequently, on one hand, the center of gravity of the piston engine can be lowered and, on the other hand, a larger deformation zone is provided for the motor hood. The arrangement according to the invention is particularly suitable for piston engines with dry sump lubrication.

As already mentioned, the arrangement according to the present invention provides for an increased deformation zone and therefore for better pedestrian protection in case of a collision of a pedestrian with the motor vehicle. In a preferred embodiment, the axes of rotation 3, 5 are displaced by an amount V of 15 mm whereby a vertical distance between the piston engine and the motor hood 1a of more than 35 mm, particularly about 40 mm, is obtained.

What is claimed is:

1. A support arrangement for an engine and transmission in a motor vehicle with said engine being arranged at the front end of said motor vehicle, said engine (1) having a drive shaft (3') rotatable about a drive shaft axis (3), a drive wheel (2) mounted on said drive shaft and a torque converter unit (6) having an input shaft (5a) with an input shaft axis (5), an input wheel (4) mounted on said input shaft (5a) for rotation therewith, said drive shaft axis (3) and said input shaft axis (5) being displaced vertically by an amount V, and intermediate power transmission wheels (8, 9) having parallel axes of rotation (10, 11) and each said intermediate transmission wheel being disposed in engagement with said drive wheel (2) of said engine and said input wheel (4) of said torque converter unit (6) for transmitting the power of said engine (1) to said torque converter unit (6) via the intermediate transmission wheels (8, 9) on which said drive wheel (2) and said input wheel (4) are rolling.

2. A motor vehicle engine and transmission support arrangement according to claim 1, wherein said two intermediate wheels (8, 9) are gears each comprising two gear areas which are joined so as to rotate in unison, and one of which (8a) is in engagement with said drive wheel (2) while the other (8b) is in engagement with said input wheel (4).

3. A motor vehicle engine and transmission support arrangement according to claim 1, wherein said drive wheel (2) and said input wheel (4) have different diameters which are selected based on the displacement V between the drive shaft of said engine and the input shaft of said torque converter unit (6) in such a way that the contact points (B) between the drive wheel (2) and the power transmission means (8, 9) and between the input wheel (4) and the power transmission means (8, 9) are disposed on a line which extends parallel to the axes of rotation (3, 5) of said drive wheel (2) and said input wheel (4).

4. A motor vehicle engine and transmission support arrangement according to claim 1, wherein said engine (1) is covered by a hood (1a) extending above said engine (1) in spaced relationship therefrom, the distance between said engine (1) and said hood (1a) being at least 25 mm and the displacement between the axis of rotation (3) of the drive shaft of said engine (1) and the axis of rotation (5) of said input shaft (5a) of said torque converter unit (6) being greater than 5 mm.

5. A motor vehicle engine and transmission support arrangement according to claim 4, wherein the distance between the engine (1) and the hood (1a) is more than 35 mm and the displacement between the axis of rotation (3) of the drive shaft of the engine and the axis of rotation (5) of the input shaft (5a) of the torque converter unit (6) is greater than 10 mm.

\* \* \* \* \*